(12) United States Patent
Elyas et al.

(10) Patent No.: US 10,871,762 B2
(45) Date of Patent: Dec. 22, 2020

(54) REAL TIME ANALYSIS OF FLUID PROPERTIES FOR DRILLING CONTROL

(71) Applicant: Saudi Arabian Oil Company, Dhahran (SA)

(72) Inventors: Odai Elyas, Dhahran (SA); Abdullah Saleh Hussain Al-Yami, Dhahran (SA); Salem H. Al Gharbi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/295,788

(22) Filed: Mar. 7, 2019

(65) Prior Publication Data
US 2020/0285216 A1    Sep. 10, 2020

(51) Int. Cl.
*G05B 19/406* (2006.01)
*G06N 20/00* (2019.01)

(52) U.S. Cl.
CPC .......... *G05B 19/406* (2013.01); *G06N 20/00* (2019.01); *G05B 2219/45129* (2013.01)

(58) Field of Classification Search
CPC .............................. G05B 19/406; G06N 20/00
See application file for complete search history.

(56) References Cited

U.S. PATENT DOCUMENTS

| | | |
|---|---|---|
| 9,022,140 B2 | 5/2015 | Marx et al. |
| 9,279,299 B2 | 3/2016 | Lovorn |
| 2004/0211595 A1* | 10/2004 | Pinckard ............... E21B 44/005 175/24 |
| 2009/0114445 A1* | 5/2009 | Dashevskiy ............ E21B 44/00 175/45 |
| 2011/0040501 A1 | 2/2011 | Martin et al. |
| 2012/0145456 A1 | 6/2012 | Rowden |
| 2012/0241217 A1 | 9/2012 | Davis et al. |
| 2013/0146357 A1 | 6/2013 | Lovorn |

(Continued)

FOREIGN PATENT DOCUMENTS

| | | |
|---|---|---|
| WO | 2015023185 | 2/2015 |
| WO | 2016040272 | 3/2016 |

OTHER PUBLICATIONS

PCT International Search Report and Written Opinion in International Appln. No. PCT/US2020/020783, dated May 25, 2020, 14 pages.

*Primary Examiner* — Vincent H Tran
(74) *Attorney, Agent, or Firm* — Fish & Richardson P.C.

(57) ABSTRACT

Techniques are described for controlling drilling operations based on real time measurement and analysis of fluid properties in a drilling environment. Sensor data can be collected that provides measurement(s) of fluid properties (for example, density and rheology) of the drilling fluid (in other words, downhole mud) around the drill. The measurements can be provided to a hydraulic model that calculates downhole pressure loss in the annulus. Based on this calculation, a calculation of equivalent circulating density (ECD) can be performed. In some implementations, the calculations are performed in real time with respect to the collection of the sensor data. The real time pressure loss and ECD calculations can be used to control bottom hole circulating pressures. The results of the calculations may be used to automatically control drilling operations.

20 Claims, 4 Drawing Sheets

(56) References Cited

U.S. PATENT DOCUMENTS

| | | |
|---|---|---|
| 2014/0105446 A1 | 4/2014 | Maxey et al. |
| 2014/0149043 A1 | 5/2014 | Beisel et al. |
| 2014/0353033 A1 | 12/2014 | Pink et al. |
| 2015/0211350 A1 | 7/2015 | Norman et al. |
| 2016/0245048 A1* | 8/2016 | Jamison .................. E21B 44/00 |
| 2016/0273331 A1 | 9/2016 | Davis et al. |
| 2017/0009543 A1* | 1/2017 | Lovorn .................. E21B 44/00 |
| 2017/0037721 A1* | 2/2017 | Lovorn ................ G05B 19/402 |
| 2017/0131429 A1 | 5/2017 | Schneider |
| 2017/0191919 A1* | 7/2017 | Kulkarni ................. E21B 21/06 |
| 2017/0198536 A1* | 7/2017 | Song ........................ G06N 5/04 |
| 2018/0135401 A1* | 5/2018 | Dykstra .................. E21B 44/00 |
| 2018/0171775 A1* | 6/2018 | Santos .................. E21B 47/065 |
| 2018/0230761 A1* | 8/2018 | Sehsah .................... E21B 44/00 |
| 2019/0024495 A1* | 1/2019 | Wise ....................... G05B 19/18 |
| 2019/0242204 A1* | 8/2019 | Skaugen ................ E21B 21/08 |

* cited by examiner

REAL TIME ANALYSIS OF FLUID PROPERTIES FOR DRILLING CONTROL

BACKGROUND

Drilling operations, such as operations of oil and gas extraction apparatuses, can be adversely affected by conditions in the drilling environment. For example, sub-optimal fluid properties of the mud in vicinity of a drillstring may adversely affect the drilling operations, leading to safety hazards, inefficiencies, and increased cost.

SUMMARY

Implementations of the present disclosure are generally directed to techniques for controlling drilling based on determined fluid properties. More particularly, implementations of the present disclosure are directed to a drilling control platform that measures downhole fluid properties (such as density and rheology) of drilling fluid and performs real time calculations based on the measured properties. The calculations can include pressure loss calculations, equivalent circulating density (ECD) calculations, or both real time pressure loss and ECD calculations. Results of the real time calculations can be used to control drilling operations.

In general, aspects of the subject matter described in this specification can be embodied in a method that performs various operations. The operations include accessing sensor data that describes fluid properties of drilling fluid in a drilling environment. The sensor data are generated by one or more sensor devices that are arranged in the drilling environment to measure the fluid properties. The sensor data are analyzed to generate an ECD value for the drilling fluid. The analyzing of the sensor data to generate the ECD value can be performed in real time with respect to the generation of the sensor data. Based at least partly on the ECD value, at least one control signal is transmitted to modify at least one operation of a drilling apparatus operating in the drilling environment. The transmitting of the at least one control signal can be performed in real time with respect to the generating and the analyzing of the sensor data.

These and other implementations can each optionally include one or more of the following aspects.

In some implementations, the sensor data describes one or more of density and rheology of the drilling fluid.

In some implementations, the sensor data is further analyzed to generate a total pressure loss for the drilling fluid.

In some implementations, the at least one control signal is sent further based on the total pressure loss.

In some implementations, a graphical representation of the ECD value can be presented in a user interface (UI) in real time with respect to the generation and analyzing of the sensor data.

In some implementations, the graphical representation shows a variation of the ECD value with respect to one or more of time and depth.

In some implementations, analyzing the sensor data includes providing the sensor data as input to at least one model that has been trained to output the ECD value based on the sensor data. The at least one model may be trained using at least one machine learning (ML) algorithm, In some implementations, the output ECD value is further employed to retrain the at least one model.

In some implementations, the at least one control signal is transmitted to modify the at least one operation that alters one or more of the weight and the rheology of the drilling fluid.

In some implementations, the at least one control signal is transmitted to modify the at least one operation that alters the circulation rate of the drilling fluid.

In some implementations, the at least one control signal is transmitted to modify the at least one operation that adjusts downhole pressure of the drilling fluid by applying surface back pressure from a choke.

Other implementations of any of the aspects include corresponding systems, apparatus, or computer programs that are configured to perform the operations of the methods. The present disclosure also provides a computer-readable storage medium coupled to one or more processors and having instructions stored on the medium. When executed by the one or more processors, the instructions cause the one or more processors to perform operations in accordance with implementations of the methods provided in this disclosure. The present disclosure further provides a system for implementing the methods. The system includes one or more processors and a computer-readable storage medium coupled to the one or more processors. Instructions are stored on the medium. The instructions are executable by the one or more processors. When executed the instructions cause the one or more processors to perform operations in accordance with implementations.

The real time calculations of pressure loss, ECD, or both pressure loss and ECD, can be used to provide more fine-tined control over bottom hole circulating pressures compared to previously available techniques. The calculations are performed based on sensor data collected by sensor device(s). The employed sensor device(s) can perform automated fluid property measurements more frequently than is traditionally available through manual property measurements that may be performed every few hours, which effectively provides information regarding the state of the mud in real time. The use of real time sensor data to calculate ECD results in up-to-date ECD values that can be used to control borehole pressure. For example, the calculated values can be used to maintain the pressure within a particular range of pressures, thus providing increased safety, reduced cost, and reduced risk. In some implementations, the platform obtains real time fluid properties measurements by collecting sensor data periodically (for example, every few seconds), analyzes the sensor data to calculate pressure loss using one or more hydraulic models, and calculates ECD values in real time based on the pressure loss. The calculated results can be sent to rig operators for timely decision making regarding pressure control. The results can also be used to automatically control drilling operations, such as operations for pressure control. Implementations provide real time calculations of pressure loss and ECD values. The real time calculations of pressure loss and ECD values can be used to control downhole pressure. Such control avoids influx and loss circulation in drilling operations.

Using techniques described in this disclosure, mud parameters can be adjusted to change ECD faster than previously used techniques. Real time ECD calculations obtained by the platform can allow for accurate and easy adjustment of the circulation rate to modify ECD based on various operational needs. Moreover, managed pressure drilling operations can manipulate ECD by adjusting the surface back pressure that is applied while drilling based on operational parameters. In instances when additional downhole pressure is to be provided, operations can be performed to apply surface back pressure from the choke. The code described in this disclosure can make such operations more efficient and more accurate by allowing for accurate determination of the ECD that is appropriate for the particular circumstances.

Many different conditions may affect the integrity of the drilling fluid, such as insufficient solids removal or drilling fluid contamination, either of which can change drilling fluid properties. Such conditions may be detected through the real time calculations of pressure loss and ECD performed by the platform. Such conditions, if undetected and unaddressed, may cause problems in the drilling operations, such as taking a kick or loss circulation. Accordingly, by providing real time and accurate results of ECD, implementations ensure smoother drilling operations, reducing time to drill, and increasing safety, to a degree that was not feasible using traditional, previously available techniques.

It is appreciated that implementations in accordance with the present disclosure can include any combination of the aspects and features described in this disclosure. Implementations in accordance with the present disclosure are not limited to the combinations of aspects and features specifically described in this disclosure, but also include any other appropriate combinations of the aspects and features provided.

The details of one or more implementations of the present disclosure are set forth in the accompanying drawings and the description. Other features and advantages of the present disclosure will be apparent from the description and drawings, and from the claims.

DETAILED DESCRIPTION

Figure 1:
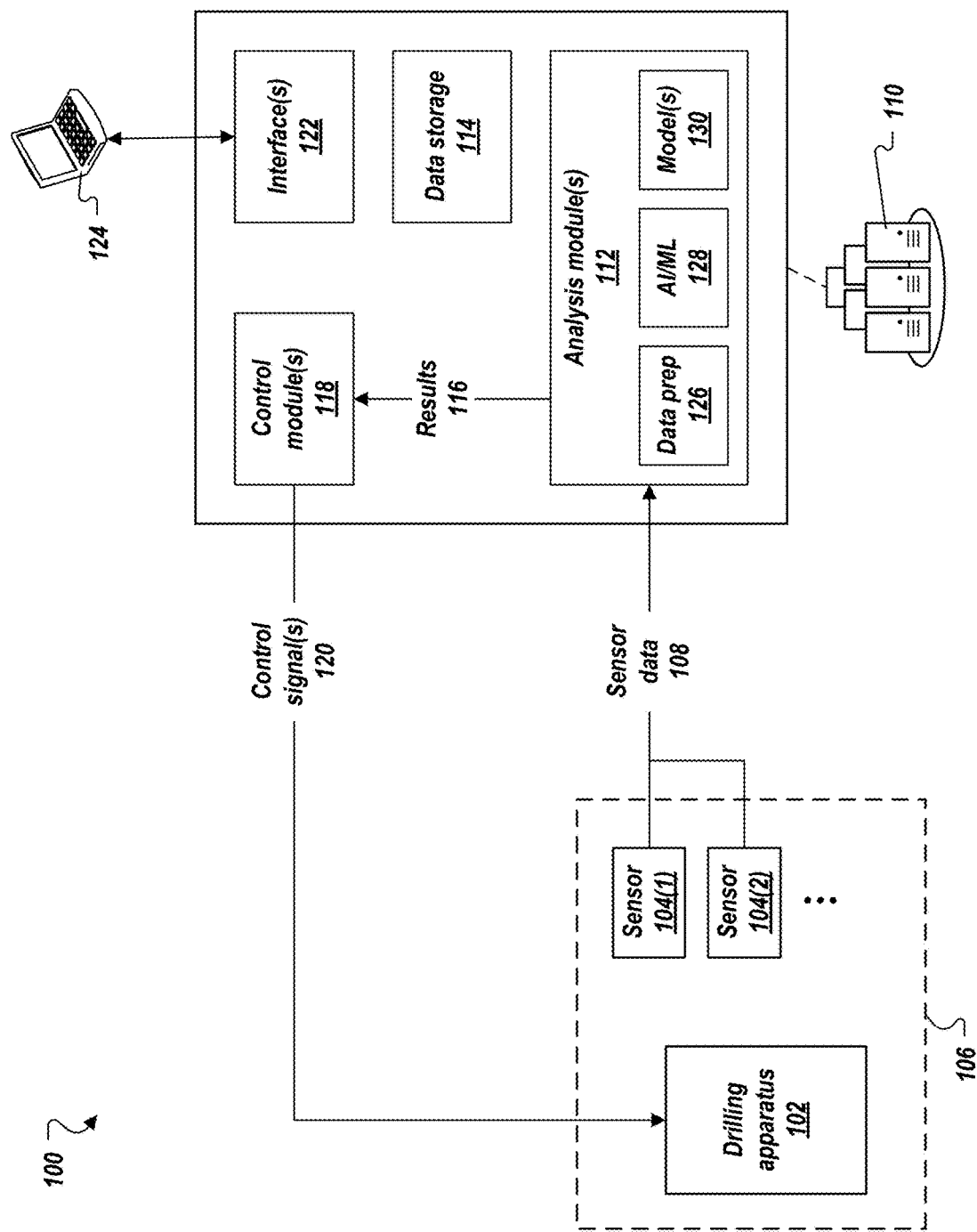
FIG. 1 depicts an example system for controlling drilling operations, according to implementations of the present disclosure.

Implementations of the present disclosure are directed to techniques for controlling drilling operations based on real time measurement and analysis of fluid properties in a drilling environment. Sensor data is collected that provides measurement(s) of fluid properties of the drilling fluid around the drill. The fluid properties can include, for example, density, rheology, or both density and rheology. The drilling fluid can also be described as downhole mud. The measurements are provided to a hydraulic model that calculates downhole pressure loss in the annulus. Based on this calculation, a calculation of ECD is performed. In some implementations, the calculations are performed in real time with respect to the collection of the sensor data. The real time calculations of pressure loss, ECD, or both pressure loss and ECD, can be used to control bottom hole circulating pressures. In some implementations, the results of the calculations are used to automatically control drilling operations. The results of the calculations can also be provided to operators through a user interface (UI) or a messaging service. Results can also be provided to other applications through an application programming interface (API) exposed by the platform.

Implementations provide a drilling control platform that calculates the ECD of the mud in a drilling environment based on real time sensor data that describes current fluid properties, such as density and rheology. The use of real time sensor data to calculate ECD results in current ECD values that can be used to control borehole pressure. For example, the values can be used to maintain the pressure within a particular range of pressures. In some implementations, the platform obtains real time fluid properties measurements by collecting sensor data periodically (for example, every few seconds), analyzes the sensor data to calculate pressure loss using one or more hydraulic models, and calculates ECD values in real time based on the pressure loss. The results can be used to automatically control drilling operations. For example, the results can be used to automatically perform operations for pressure control.

In some implementations, the platform receives real time sensor data that includes measurements of fluid density and rheology made through use of one or more sensor devices (also described as sensors) installed on site. For example, the sensors include one or more of a densometer for measuring density and a viscometer for measuring rheology. The platform can receive current sensor data. For example, one measurement of density is obtained every minute, and one rheology measurement is obtained every 15 minutes. In some examples, the platform stores the sensor data (or at least a recent batch of the sensor data) in a database or other data storage, where the data is accessed to perform the calculations to determine pressure loss and ECD.

A real time operation, in some examples, is an operation that is performed immediately without unnecessary delay following a triggering event, such as a received signal or detection of a particular system state. A real time operation may be performed in response to the triggering event without requiring an intervening human action. A real time operation may be performed as soon as is feasible within a computing system while accounting for the time needed to communicate and process information in the computing system, such as the time to access data storage, send and receive network communications, or execute computing instructions. A real time operation can also be described as a dynamic operation. In some examples, a real time action may be performed synchronously with respect to the triggering event. In some examples, a real time action may be performed within a same execution path as the detection and handling of the triggering event.

FIG. 1 shows an example system 100 for controlling drill operations based on real time calculations of ECD and pressure loss, according to implementations of the present disclosure. As shown in the example, the system 100 includes a drilling apparatus 102 and any number of sensors 104 present in a drilling environment 106, such as sensors 104(1) and 104(2) in the example shown. Implementations can be used with any drilling apparatus 102, such as a drilling apparatus used for oil or gas extraction. The sensor(s) 104 are be arranged in the drilling environment 106 to collect real time sensor data 108 regarding the operations of the drilling apparatus 102. For example, the sensor data 108 includes measurements of density and rheology (in other words, viscosity) of the mud in the downhole vicinity of a drill, in a well or borehole. In some implementations, the sensor data describing the fluid properties of the downhole mud are obtained using sensor(s) 104 that measure density and rheology. The sensor(s) 104 can be installed on the drilling apparatus 102 (for example, the drilling rig).

The sensor data 108 are transmitted over one or more networks to the drilling control platform 110, also described as the platform. The platform 110 includes software executing on any number and type of computing devices, including devices for distributed computing (for example, cloud computing servers). The software includes analysis module(s) 112, control module(s) 118, and interface(s) 122. The analysis module(s) 112 can include data preparation module(s) 126, artificial intelligence (AI)/machine learning (ML) module(s) 128, and any number of models 130. The platform 110 also includes data storage 114 of any type, such as a database. In some implementations, the platform 110 employs data storage that is external to the platform 110 and accessible over one or more networks.

The analysis module(s) 112 receive the sensor data 108 and analyze the sensor data 108 in real time, as it is received, to determine results 116, such as current pressure loss and ECD values. Such calculations are described further with reference to FIGS. 2 and 3. In some implementations, data preparation module(s) 126 perform operations that include one or more of the following: converting the sensor data 108 from analog to digital, formatting the converted sensor data 108, and filtering out anomalous data prior to further analysis. In some examples, at least a portion of the conversion, formatting, or filtering are performed by the sensor(s) 104 prior to transmitting the data to the platform 110.

The AI/ML module(s) 128 perform various AI and ML operations to analyze the data. For example, the module(s) 128 employ supervised ML algorithms, unsupervised ML algorithms, or both supervised and unsupervised ML algorithms to develop model(s) 130 that are used to analyze the incoming sensor data 108. Such model(s) 130 output results for pressure loss and ECD based on the incoming sensor data 108. In some examples, the model(s) 130 are trained using training data, in a supervised or unsupervised manner, to predict pressure loss and ECD based on received sensor data 108. In some implementations, the platform employs AWL module(s) 128 that implement AI and ML solutions. Such solution(s) may be provided by a third party in some examples. In some examples, one or more of the AWL module(s) 128 and model(s) 130 operate in real time to provide analysis results in real time with respect to the generation of the sensor data 108. Implementations support the use of (for example, third party, real time) AI and ML solutions, and can integrate third party solution(s) with other (for example, in-house developed) solution(s).

The model(s) 130 may include one or more of a Drag model and a Stand Pipe Pressure (SPP) model. These models may be included in the code. The code is also configured to be flexible and able to support additional models, such as models for torque and drag, hydraulics, and hole cleaning. The analysis module(s) 112 may also include module(s) for quality control and quality assurance, to determine the quality (for example, accuracy) of the results 116 produced by the analysis.

The results 116 produced by the analysis are stored in the data storage 114. In some implementations, at least a portion of the sensor data 108 can also be stored in the data storage 114. In some implementations, a recent set of one or both of the sensor data 108 and results 116 can be stored in the data storage 114. For example, the last day's worth of sensor data 108 and results 116 can be stored. Implementations support the use of any type of data storage 114, such as a relational database or non-relational data storage (for example, a key-value store).

The result(s) 116 are received by control module(s) 118 that automatically perform operations to control the drilling apparatus 102 based on the results(s) 116. For example, drilling operations may be adjusted based on real time calculations of pressure loss and ECD in the downhole mud. The control may be through one or more control signal(s) 120 that are generated and sent by the control module(s) 118 to the drilling apparatus 102 to control operations.

In some implementations, the results 116 are also provided through the interface(s) 122. The interface(s) 122 can include API(s) that allow the results 116 to be received by other applications or services calling into the API(s). In some implementations, the interface(s) 122 include UI(s) 122, such as web interface(s). The UI(s) 122 can be presented on data consuming device(s) 124 accessible to operator(s). The data consuming device(s) 124 can include any type of computing device, including portable computing devices (for example, smart phones, tablet computers) as well as less portable types of computing devices (for example, laptop computers, desktop computers). The UI(s) may provide a visualization, updated in real time, of at least a portion of the sensor data 108 and the results 116. For example, calculated pressure loss and ECD values are displayed in graphical or text format in the UI(s), and updated in real time as current sensor data 108 is received and analyzed.

Figure 3:
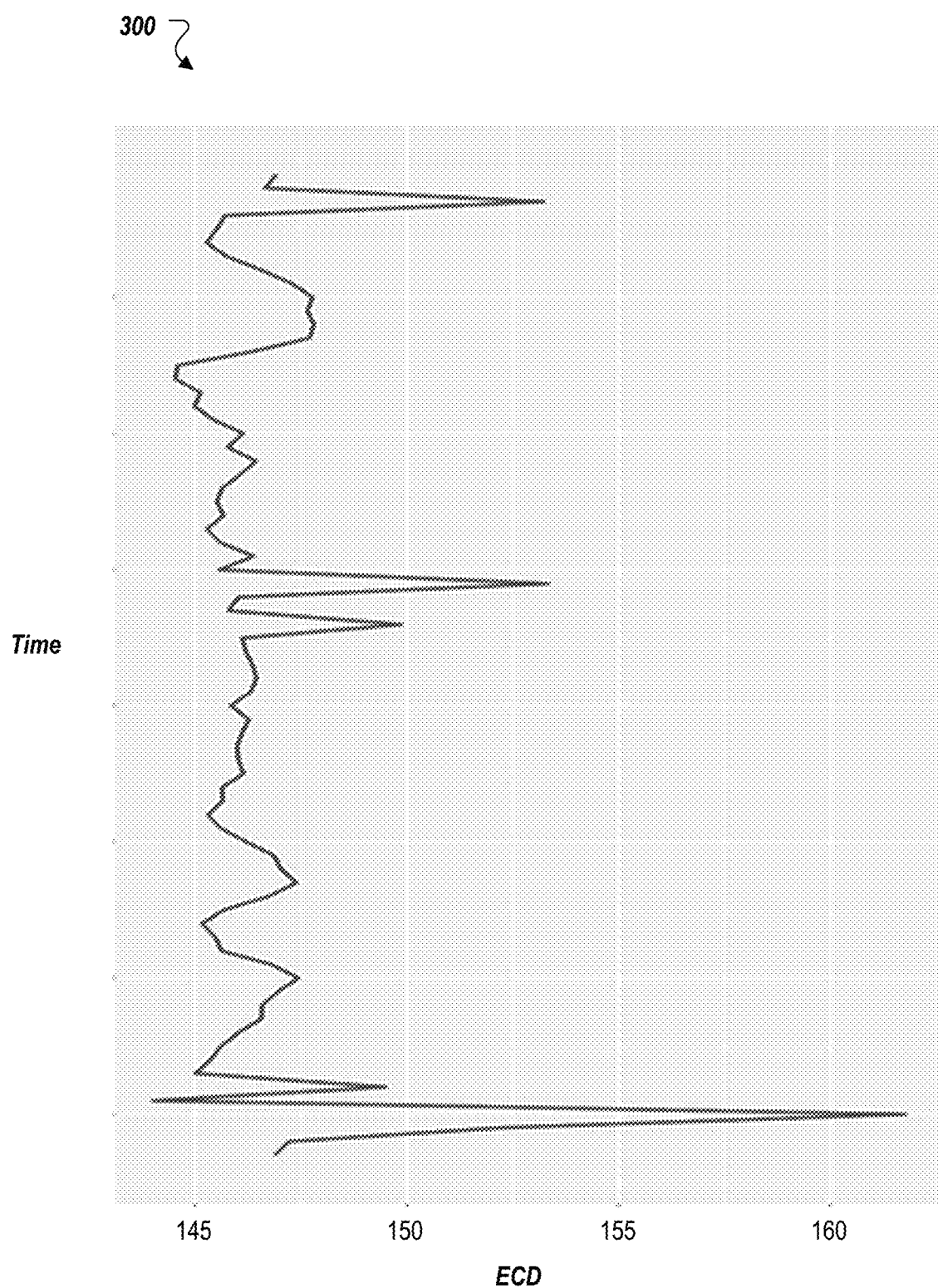
FIG. 3 depicts an example visualization of calculation results, according to implementations of the present disclosure.

FIG. 3 shows an example 300 of a data visualization that is provided as a line graph of ECD values. In some implementations, the UI(s) provide controls that allow an operator to specify to the control module(s) 118 the drilling control operations to be performed. The user command(s) can be entered through the UI to request particular adjustments to the drilling operations, and can be provided to the control module(s) 118 using the coded instructions. On receiving such command(s), the control module(s) 118 may send the corresponding control signal(s) 120 to initiate the adjustments at the drilling apparatus 102 according to the commands submitted through the UI(s). In some examples, the adjustments are made to control ECD values of the fluid. For example, operations are performed to adjust mud properties, such as ECD, by changing mud weight and mud rheology. As another example, adjustments alter the circulation rate of the drilling fluid by adjusting the fluid flow rate in gallons per minute (gpm), which can also lead to a change of ECD for the drilling operations.

In some implementations, the analysis of the sensor data 108 is performed by the analysis module(s) 112 to calculate pressure loss and ECD values. The analysis can be performed in real time with respect to the generation of the sensor data 108 by the sensor(s) 104 or with respect to the receipt of the sensor data 108 at the platform 110. The result(s) 116 can be used by the control module(s) 118 to send the control signal(s) 120 to control drilling operations in real time with respect to the generation of the results 116. Moreover, the result(s) 116 can be provided through the interface(s) 122 in real time with respect to the generation of the results 116. The sensor data 108 may be described as real time data in that it describes a currently measured fluid state of the drilling fluid (in other words, the downhole mud) updated periodically (for example, every three seconds). Real time data can also be described as current data that reflects a current or suitably recent state of the environment being described.

Figure 2:
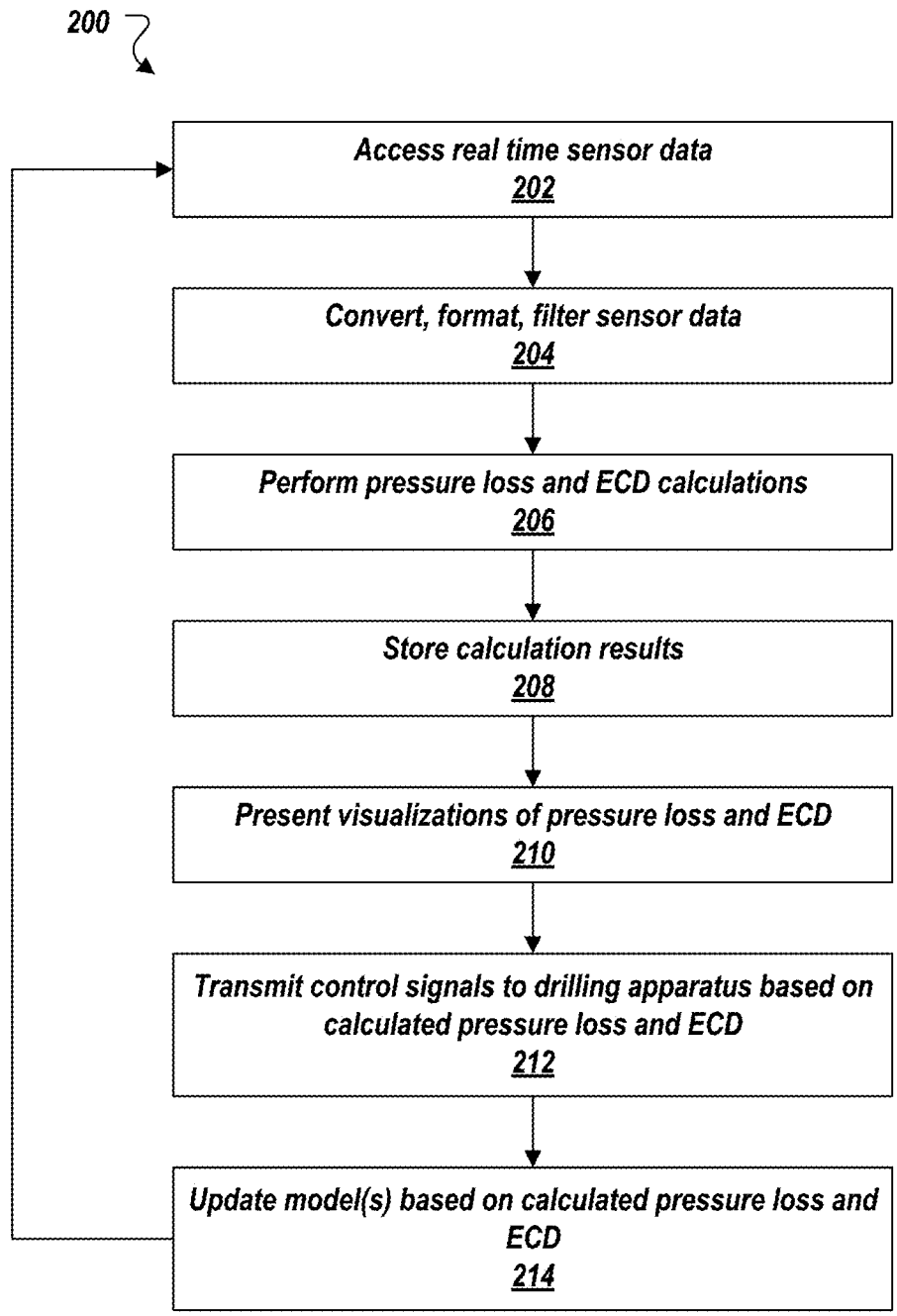
FIG. 2 depicts a flow diagram of an example process for controlling drilling operations, according to implementations of the present disclosure.

FIG. 2 shows an example flow diagram of a process 200 to control drilling operations based on real time calculations of ECD and other values, according to implementations of the present disclosure. Operations of the process can be performed by one or more of the analysis module(s) 112, the control module(s) 118, the interface(s) 122, or other software module(s) executing on the platform 110 or elsewhere.

The sensor data 108 are received (202) or otherwise accessed in real time, as it is generated by the sensor(s) 104 in the drilling environment 102. In some implementations, the process performs (204) one or more of the following with respect to the sensor data 108: the sensor data 108 are converted from analog to digital, the sensor data 108 are formatted to conform to a version of a predetermined format, and the sensor data 108 are filtered to remove anomalous or outlying data points. In some examples, at least a portion of such operation(s) are performed by the sensor device(s) 104.

The sensor data 108 is analyzed (206) to perform the pressure loss and ECD calculations, such as through use of the model(s) 130. The calculation results 116, at least a portion of the sensor data 108, or both results 116 and data 108 can be stored (208) in the data storage 114. Visualizations of the pressure loss and ECD can be presented (210) through the UI(s). Moreover, based on the calculated pressure loss and ECD values, control signal(s) 120 can be transmitted (212) to the drilling apparatus 102 to control drilling operations. In some examples, the control signal(s) 120 are sent automatically based on the pressure loss and ECD values. In some implementations, the model(s) 130 are updated (214) (for example, retrained or otherwise refined) based on the calculated pressure loss and ECD values.

The fluid property measurements included in the sensor data 108 can be obtained and received at the platform 110 at frequencies (for example, every second or every few seconds), such that the sensor data 108 reflects the current and up-to-date fluid state of the downhole mud. The sensor data 108 can be provided as input to the model(s) 130 that provide outputs of pressure loss and ECD, which are both used to control drilling operations. In some implementations, the generation and analysis of sensor data 108 and controlling of drilling operations are performed within a timespan of approximately 3-5 seconds. This provides the platform with the ability to present results to personnel, and to control drilling operations, automatically and in real time.

After gathering the input sensor data 108, the data can be sent to a hydraulic model, where a series of equations and calculations are preformed to measure the annular pressure loss of each section. The annular losses can be added to obtain the total pressure loss in the annulus. This total pressure loss can be used to calculate ECD. For example, ECD can be calculated as ECD=MW+PL0.052*TVD. MW refers to fluid mud weight (for example, density), PL refers to pressure loss (for example, in pounds per square inch (psi)), and TVD refers to true vertical depth (for example, in feet).

In some implementations, density measurements are performed once per minute, and rheology measurements are performed once every 15 minutes. The collected data can be analyzed in real time as it is generated to provide current values of pressure loss and ECD. Such values can be used to automatically control drilling operations. The values can also be displayed to drilling engineers or foremen.

In some implementations, the pressure loss calculations are performed to determine real time values of the ECD. Various techniques can be used for the hydraulic model, including but not limited to one or more of the following: the American Petroleum Institute (API) model, the Herschel-Bulkley model, and the Power Law model. The platform may use one or more of these hydraulic models to perform hydraulic calculations. The examples in the Tables and Formulas of this disclosure provide examples of hydraulic model calculation using the API model.

Tables 1 through 3 show examples of input parameters that may be employed. Table 1 provides examples of fluid properties parameters. In Table 1 and elsewhere, Rn refers to a viscometer reading at n rotations per minute (rpm). For example, R100 is a viscometer reading at 100 rpm. Q refers to flow.

TABLE 1

| MW (pcf) | 145 |
|---|---|
| R600 | 88 |
| R200 | 41 |
| R100 | 29 |
| R6 | 10 |
| R3 | 9 |
| Plastic viscosity | 35 |
| Yield point | 18 |
| Q (gpm) | 300 |

Table 2 provides example hole and casing sizes. ID refers to inner diameter.

TABLE 2

| Casing ID | Hole ID |
|---|---|
| 8.435 | 8.375 |

Table 3 provides example bottom hole assembly and drill string properties and lengths. Table 3 includes data expressed in inches (in) and feet (ft). OD refers to outer diameter. Joints is abbreviated as jts.

TABLE 3

| Description | OD (in) | ID (in) | Max OD (in) | Length (ft) | Cumul. depth |
|---|---|---|---|---|---|
| Drillstring | | | | | |
| 5.5" drillpipe to surface | 5.5 | 4.67 | 6.625 | 11491.92 | 11491.92 |
| Bottom Hole Assembly (BHA) | | | | | |
| 9.5 × 5.5" heavyweight drillpipe (9jts) | 5.5 | 3.25 | 6.625 | 274.56 | 11766.48 |
| Crossover | 6.5 | 2.74 | 6.5 | 3.49 | 11769.97 |
| 2 × 6.5" collar (2jts) | 6.5 | 2.875 | 6.5 | 61.31 | 11831.28 |
| Hydro-mechanical jar | 6.375 | 2.75 | 6.375 | 32.22 | 11863.5 |
| 14 × 6.5" collar (14jts) | 6.5 | 2.875 | 6.5 | 424.95 | 12288.45 |
| Crossover | 6.438 | 2.813 | 6.438 | 3.38 | 12291.83 |
| Float Sub | 6.625 | 2.688 | 6.625 | 3.91 | 12295.74 |
| Float Sub | 6.625 | 2.688 | 6.625 | 3.98 | 12299.72 |
| Crossover | 6.5 | 2.75 | 6.5 | 3.7 | 12303.42 |
| Stabilizer | 6.375 | 2.875 | 6.375 | 7.22 | 12310.64 |
| 6.5" collar | 6.5 | 2.875 | 6.5 | 30.36 | 12341 |
| Stabilizer | 6.375 | 1.875 | 6.375 | 7.2 | 12348.2 |
| 6.5" collar | 6.5 | 2.75 | 6.5 | 31.13 | 12379.33 |
| Bit Sub with float valve | 6.5 | 2.75 | 6.5 | 3.65 | 12382.98 |
| TVD (ft) | | | | | 11238.96 |

Formulas 1-5 and Tables 4-7 illustrate example calculation procedures that may be employed (for example, using an API method). Formulas 1 and Table 4 show an example algorithm and results of calculating flow behavior and consistency indexes.

$$na = 0.657 \log\left(\frac{R100}{R3}\right) \text{ (for annular flow)} \quad \text{Formulas 1}$$

where na is flow behavioral index.

$$k = \frac{5.11 + R100}{170.2^{na}}$$

where K is consistency index.

TABLE 4

| Flow behavior and consistency | |
|---|---|
| na | 0.333858156 |
| ka | 26.6682707 |

Formulas 2 and Table 5 show an example algorithm and results for calculating annular velocity, effective viscosity, and Reynolds number.

$$V_a = \frac{0.408 * Q}{D2^2 - D1^2} \quad \text{Formulas 2}$$

where $V_a$ is annular velocity (for example, feet/second), Q is flow (for example, in gpm), D2 is the OD (for example, inches), and D1 is the ID (for example, inches).

$$\mu e = 100 * ka * \left(\frac{144 * V_a}{D2 - D1}\right)^{na-1} * \left(\frac{2na + 1}{3na}\right)^{na}$$

where μe is viscosity, K is consistency index, na is flow behavioral index, D2 is outer diameter, and D1 is inner diameter.

$$NRe = \frac{928 * (D2 - D1) * V_a * \rho}{\mu e}$$

where NRe is Reynolds Number, and ρ is density.

TABLE 5

| $V_a$ | μe | NRe |
|---|---|---|
| Drillstring | | |
| 2.992721745 | 113.8974745 | 1387.31 |
| BHA | | |
| 3.068390129 | 110.4879283 | 1436.31 |
| 4.388571429 | 65.48287014 | 2260.53 |
| 4.388571429 | 65.48287014 | 2260.53 |
| 4.419152542 | 70.96243974 | 2103.66 |
| 4.388571429 | 65.48287014 | 2260.53 |
| 4.265881373 | 68.19339714 | 2179.77 |
| 4.662857143 | 60.06605948 | 2443.85 |
| 4.662857143 | 60.06605948 | 2443.85 |
| 4.388571429 | 65.48287014 | 2260.53 |
| 4.419152542 | 70.96243974 | 2103.66 |
| 4.388571429 | 65.48287014 | 2260.53 |
| 4.419152542 | 70.96243974 | 2103.66 |
| 4.388571429 | 65.48287014 | 2260.53 |
| 4.388571429 | 65.48287014 | 2260.53 |

Formulas 3 and Table 6 show an example algorithm and results for calculating friction factor.

$$\text{Laminar flow } (NRe < 2100): \quad fa = \frac{24}{NRe} \quad \text{Formulas 3}$$

where fa is coefficient of friction.

Turbulent Flow $$a = \frac{\log(na) + 3.93}{50}$$

$$b = \frac{1.75 - \log(na)}{7}$$

$$fa = \frac{a}{NRe^b}$$

TABLE 6

| Turbulent flow parameters | |
|---|---|
| a | 0.06907124 |
| b | 0.318062573 |

Formula 4 shows an example algorithm for calculating pressure loss. L is length.

$$PL = \frac{fa * V_a^2 * \rho}{25.81 * (D2 - D1)} * L \quad \text{Formula 4}$$

Formula 5 and Table 7 show an example algorithm and results for calculating ECD.

$$ECD = \frac{\text{Total pressure loss in the annulus}}{TVD/0.052} + MW \quad \text{Formula 5}$$

Formula 5 provides ECD in ppg. To convert from pounds per gallon (ppg) to pounds per cubic foot (pcf), the result is multiplied by 7.48, where ppg and pcf are units used to measure mud weight (for example, density of drilling fluid).

TABLE 7

| Fe | PL |
|---|---|
| 0.0173 | 455.6507 |
| 0.016709 | 11.283938 |
| 0.005922 | 0.15944 |
| 0.005922 | 2.800935 |
| 0.006059 | 1.262048 |
| 0.005922 | 19.41375 |
| 0.005991 | 0.142875 |
| 0.005777 | 0.210765 |
| 0.005777 | 0.214538 |
| 0.005922 | 0.169034 |
| 0.006059 | 0.282805 |
| 0.005922 | 1.38699 |
| 0.006059 | 0.282022 |
| 0.005922 | 1.422168 |
| 0.005922 | 0.16675 |
| Total | 494.8488 |
| ECD | 151.3402 |

The platform can receive the real time data captured from the sensors that are on-site in the drilling environment. The collected data can be transformed from analog to digital format. In some examples, the data are further transformed to comply with a particular format, such as the Wellsite Information Transfer Standard Markup Language (WITSML) format. The data are communicated to the platform, for example through wired network(s), wireless network(s), or satellite communications. The platform may store the data in a database. The frequency of the data capture, transformation, and formatting may be such that the latency between data capture onsite and storing the data is minimized. In some examples, the latency is 3-5 seconds. The platform may analyze the stored data using one or more AI/ML models, and analyze the data to generate information (for example pressure loss and ECD) that may be used to control drilling operations.

The platform may store one or both of the raw data and the processed data in the data storage. The platform may expose various UIs that display the data (for example in plotted curves). This information enables operators to monitor the current well behavior and gain insights into the historical development of such behavior. The platform may present the data relative to time or depth.

The Appendix provides an example of code that may be executed to perform operations to calculate ECD.

FIG. 3 shows example output of the code, with time plotted on the vertical axis, and ECD plotted on the horizontal axis. The graph of FIG. 3 illustrates example ECD values calculated in real time. The values calculated in real time may be used for controlling drilling operations. In some examples, the calculation results are provided in real time to drilling engineers or rig foremen. In some implementations, the platform provides real time ECD plotting such that the plot in the example of FIG. 3 is dynamically changed as updated sensor data is received and analyzed to determine current ECD values. This real time updated graph can provide the drilling engineers, operation crew, or mud engineers with current information about the status of the well from an ECD perspective.

Figure 4:
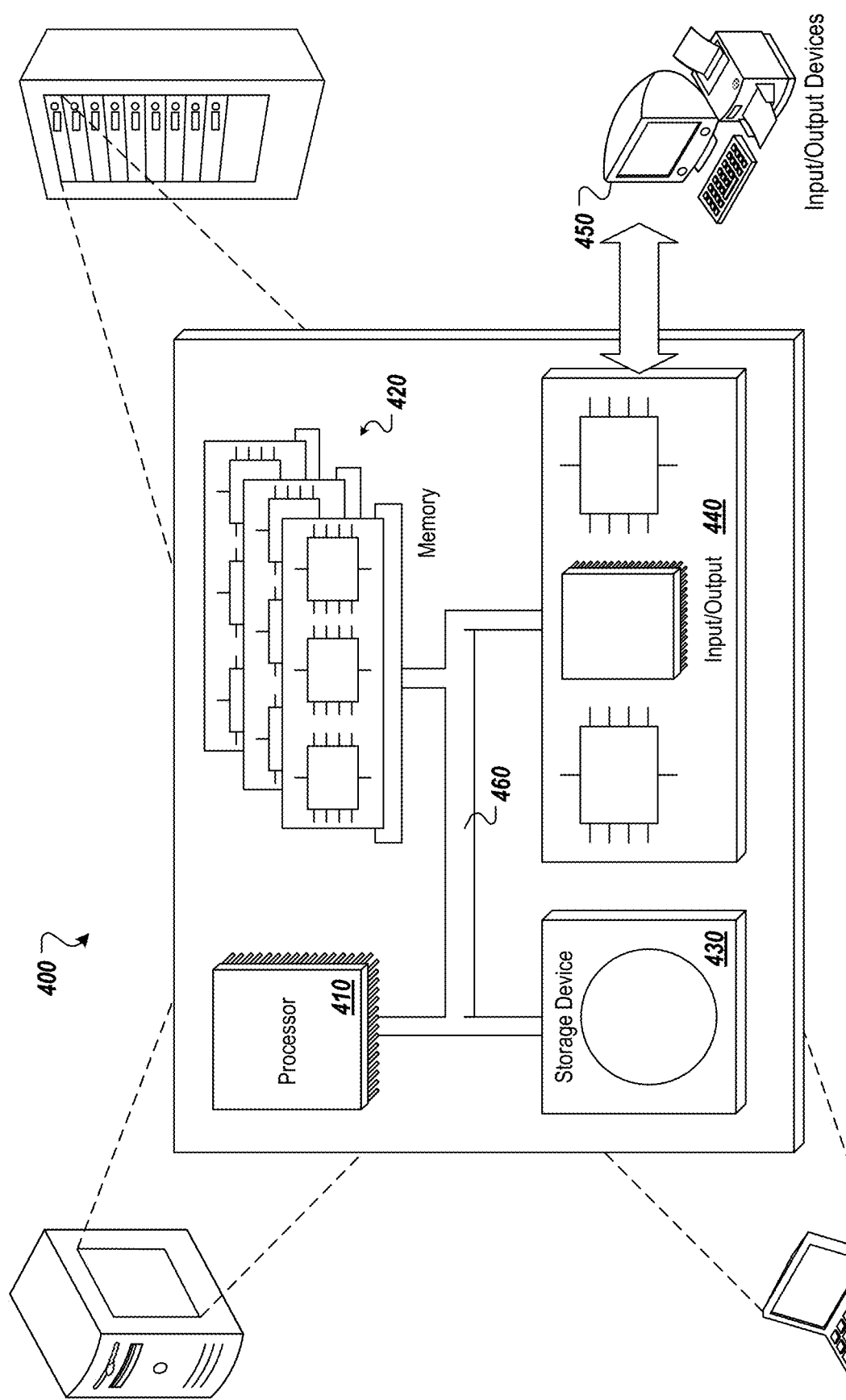
FIG. 4 depicts an example computing system, according to implementations of the present disclosure.

FIG. 4 depicts an example computing system, according to implementations of the present disclosure. The system 400 may be used for any of the operations described with respect to the various implementations discussed in this disclosure. For example, the system 400 may be included, at least in part, in one or more of the computing device(s) that execute the platform 110, and other computing device(s) or system(s) described in this disclosure. The system 400 may include one or more processors 410, a memory 420, one or more storage devices 430, and one or more input/output (I/O) devices 450 controllable via one or more I/O interfaces 440. The various components 410, 420, 430, 440, or 450 may be interconnected via at least one system bus 460. The bus 460 may enable the transfer of data between the various modules and components of the system 400.

The processor(s) 410 may be configured to process instructions for execution within the system 400. The processor(s) 410 may include single-threaded processor(s), multi-threaded processor(s), or both. The processor(s) 410 may be configured to process instructions stored in the memory 420 or on the storage device(s) 430. For example, the processor(s) 410 execute instructions for the various software module(s) described in this disclosure. The processor(s) 410 may include hardware-based processor(s) each including one or more cores. The processor(s) 410 may include general purpose processor(s), special purpose processor(s), or both.

The memory 420 may store information within the system 400. In some implementations, the memory 420 includes one or more computer-readable media. The memory 420 may include any number of volatile memory units, any number of non-volatile memory units, or both volatile and non-volatile memory units. The memory 420 may include read-only memory (ROM), random access memory (RAM), or both. In some examples, the memory 420 is employed as active or physical memory by one or more executing software modules.

The storage device(s) 430 may be configured to provide (for example, persistent) mass storage for the system 400. In some implementations, the storage device(s) 430 include one or more computer-readable media. For example, the storage device(s) 430 include one or more of a floppy disk device, a hard disk device, an optical disk device, and a tape device. The storage device(s) 430 may include ROM, RAM, or both. The storage device(s) 430 may include one or more of an internal hard drive, an external hard drive, or a removable drive.

One or both of the memory 420 or the storage device(s) 430 may include one or more computer-readable storage media (CRSM). The CRSM may include one or more of an electronic storage medium, a magnetic storage medium, an optical storage medium, a magneto-optical storage medium, a quantum storage medium, and a mechanical computer storage medium. The CRSM may provide storage of computer-readable instructions describing data structures, processes, applications, programs, other modules, or other data for the operation of the system 400. In some implementations, the CRSM provides storage of computer-readable instructions or other information in a non-transitory format. The CRSM may be incorporated into the system 400 or may be external with respect to the system 400. The CRSM may include ROM, RAM, or both. One or more CRSM for tangibly embodying computer program instructions and data may include any type of non-volatile memory, including but not limited to semiconductor memory devices, such as EPROM, EEPROM, and flash memory devices; magnetic disks, such as internal hard disks and removable disks; magneto-optical disks; and CD-ROM and DVD-ROM disks. In some examples, the processor(s) 410 and the memory 420 are supplemented by, or incorporated into, one or more application-specific integrated circuits (ASICs).

The system 400 may include one or more I/O devices 450. The I/O device(s) 450 may include one or more input devices, such as a keyboard, a mouse, a pen, a game controller, a touch input device, an audio input device (for example, a microphone), a gestural input device, a haptic input device, or an image or video capture device (for example, a camera). In some examples, the I/O device(s) 450 include one or more output devices, such as a display, LED(s), an audio output device (for example, a speaker), a printer, or a haptic output device. The I/O device(s) 450 may be physically incorporated in one or more computing devices of the system 400, or may be external with respect to one or more computing devices of the system 400.

The system 400 may include one or more I/O interfaces 440 to enable components or modules of the system 400 to control, interface with, or otherwise communicate with the I/O device(s) 450. The I/O interface(s) 440 may enable information to be transferred in or out of the system 400, or between components of the system 400, through serial communication, parallel communication, or other types of communication. For example, the I/O interface(s) 440 comply with a version of the RS-232 standard for serial ports, or with a version of the Institute of Electrical and Electronics Engineers (IEEE) 1284 standard for parallel ports. As another example, the I/O interface(s) 440 are configured to provide a connection over Universal Serial Bus (USB) or Ethernet. In some examples, the I/O interface(s) 440 are configured to provide a serial connection that is compliant with a version of the IEEE 1394 standard.

The I/O interface(s) 440 may also include one or more network interfaces that enable communications between computing devices in the system 400, or between the system 400 and other network-connected computing systems. The network interface(s) may include one or more network interface controllers (NICs) or other types of transceiver devices configured to send and receive communications over one or more communication networks using any network protocol.

Computing devices of the system 400 may communicate with one another, or with other computing devices, using one or more communication networks. Such communication networks may include public networks (for example, the Internet), private networks (for example, an institutional or personal intranet), or any combination of private and public networks. The communication networks may include any type of wired or wireless network, including but not limited to local area networks (LANs), wide area networks (WANs), wireless WANs (WWANs), wireless LANs (WLANs), and mobile communications networks (for example, 3G, 4G, Edge). In some implementations, the communications between computing devices are encrypted or otherwise secured. For example, communications employ one or more public or private cryptographic keys, ciphers, digital certificates, or other credentials supported by a security protocol, such as any version of the Secure Sockets Layer (SSL) or the Transport Layer Security (TLS) protocol.

The system 400 may include any number of computing devices of any type. The computing device(s) may include but are not limited to a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (for example, a cloud computing device), a microcomputer, a system on a chip (SoC), and a system in a package (SiP). Although some examples in this disclosure describe computing device(s) as physical device(s), implementations are not so limited. In some examples, a computing device includes one or more of a virtual computing environment, a hypervisor, an emulation, or a virtual machine executing on one or more physical computing devices. In some examples, two or more computing devices are organized as a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, in other words, one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to a receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit for use in a computing environment. A computer program does not necessarily correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example, an FPGA (field programmable gate array) or an ASIC (application specific integrated circuit).

Processors for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, for example, magnetic, magneto optical disks, or optical disks. However, a computer need not have such devices. Moreover, a computer may be embedded in another device, for example, a mobile telephone, a personal digital assistant (PDA), a mobile audio player, a Global Positioning System (GPS) receiver, to name just a few. Computer readable media for storing computer program instructions and data include all forms of non-volatile memory, media and memory devices, including by way of example semiconductor memory devices, for example, erasable programmable ROM (EPROM), electrically erasable programmable ROM (EEPROM), and flash memory devices; magnetic disks, for example, internal hard disks or removable disks; magneto optical disks; and compact disc (CD) ROM and digital versatile disc (DVD) ROM. The processor and the memory may be supplemented by, or incorporated in, special purpose logic circuitry.

To provide for interaction with a user, implementations may be realized on a computer having a display device, for example, a cathode ray tube (CRT) or liquid crystal display (LCD) monitor, for displaying information to the user and a keyboard and a pointing device, for example, a mouse or a trackball that are usable to provide input to the computer. Other kinds of devices may be used to provide for interaction with a user as well; for example, feedback provided to the user may be any appropriate form of sensory feedback, for example, visual feedback, auditory feedback, or tactile feedback; and input from the user may be received in any appropriate form, including acoustic, speech, or tactile input.

Implementations may be realized in a computing system that includes a back end component, for example, as a data server. Implementations may be realized in a computing system that includes a middleware component, for example, an application server. Implementations may be realized in a computing system that includes a front end component, for example, a client computer having a graphical user interface or a web browser through which a user may interact with an implementation. Implementations may include any appropriate combination of back end, middleware, and front end components. The components of the system may be interconnected by any appropriate form or medium of digital data communication, for example, a communication network. Examples of communication networks include a local area network ("LAN") and a wide area network ("WAN"), for example, the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any sub-combination. Moreover, although features may be described in this disclosure as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order to achieve desirable results. Moreover, the depiction of particular operations in the drawings should not be understood as requiring that all of the illustrated operations be performed to achieve desirable results. In certain circumstances, multitasking and parallel processing may be advantageous. The separation of various system components in the implementations described in this disclosure should not be understood as requiring such separation in all implementations. Further, it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown in this disclosure may be used, with steps re-ordered, added, or removed. Accordingly, other implementations are within the scope of the following claims.

APPENDIX

```
#get Hole size, Casing & BHA
HOLE_AND_CSG <- getHOLE_AND_CSG( )
BHA <- getBHA( )
#get surface data
SurfaceLog <- get_SurfaceLog( )
#get Rheology data
RheologyLog <- get_Rheology( )
#get combine the RheologyLog with SurfaceLog using Time index
RheologyLog <- combine_logs(RheologyLog, SurfaceLog)
#------------------------------------------------------------------
combine_logs <- function(RheologyLog, DepthLog){
    # add new columns
    RheologyLog[ , c('BITDEPTH_MD', 'BITDEPTH_TVD', 'FLWPMPS')] <- 0
    for(i in 1:length(RheologyLog)){
        deltaTime <- abs(DepthLog$RIGTIME - RheologyLog$DateTime[i])
        min_deltaTimeIndex <- which.min(deltaTime)
        RheologyLog[i, c('BITDEPTH_MD', 'BITDEPTH_TVD', 'FLWPMPS')] <-
DepthLog[min_deltaTimeIndex, c('BITDEPTH', 'BITDEPTH_TVD', 'FLWPMPS')]
    }# end for loop RheologyLog
    return(RheologyLog)
}#end function combine_logs
#------------------------------------------------------------------
# calculate ECD
RheologyLog <- Calc_ECD(BHA, RheologyLog, HOLE_AND_CSG)
#------------------------------------------------------------------
Calc_ECD <- function(BHA, RheologyLog, HOLE_AND_CSG){
    # add new columns
    BHA[ , c('cum_Depth', 'Va', 'Mue', 'Re', 'Fa', 'PL', 'd2')] <- 0
    RheologyLog[, c('total_annulus_PL', 'ECD_in_PCF')] <- 0
    #copy the BHA first row, to plot the drilling Pipe, inside/ outside the CSG
    inside_CSG_DP <- BHA[1,]
    inside_CSG_DP$DBC_ORDR_NUM <- inside_CSG_DP$DBC_ORDR_NUM+1
```

APPENDIX-continued

```
    BHA <- inregrate(inside_CSG_DP)
    for (i in seq(1:nrow(RheologyLog))){
        # set the depth, and length for the DP within the CSG
        BHA$cum_Depth[1] <- HOLE_AND_CSG$W_CSG_BOT_DPTH
        BHA$CMPN_LGTH[1] <- BHA$cum_Depth[1]
        # set the depth, and length for the DP after CSG to just before BHA
        BHA$cum_Depth[2] <- RheologyLog$BITDEPTH_MD[i] - sum(BHA$CMPN_LGTH[c(-1,-
2)])# substract the BHA length from the total depth
        BHA$CMPN_LGTH[2] <- BHA$cum_Depth[2] - HOLE_AND_CSG$W_CSG_BOT_DPTH
        # calculate the cumulative depth
        BHA$cum_Depth[c(-1)] <- cumsum(BHA$CMPN_LGTH[c(-1)]) + BHA$cum_Depth[1]
        #measure if the BHA components are inside the CSG or not, this can identify the d2 values
        BHA$d2 <- ifelse(BHA$cum_Depth > HOLE_AND_CSG$W_CSG_BOT_DPTH,
HOLE_AND_CSG$W_HOL_DEC_SZ, HOLE_AND_CSG$W_CSG_ID_DEC_SZ)
        if RheologyLog$Rheology Mud Visc 3RPM Sucti[i] == 0 skip this loop
        n <- 0.657 * log10(RheologyLog$'Rheology Mud Visc 100RPM Sucti'[i]/
RheologyLog$'Rheology Mud Visc 3RPM Sucti'[i])
        K <- 5.110 * RheologyLog$'Rheology Mud Visc 100RPM Sucti'[i] / (170.2^n)
        BHA$Va <- 0.408 * RheologyLog$FLWPMPS[i] / ((BHA$d2^2) - (BHA$OD_SZ^2))
        BHA$Mue <- 100* K*
                ((144*BHA$Va/(BHA$d2 - BHA$OD_SZ))^(n-1)) *
                (
                    ((2*n)+1)/(3*n)
                )^n
        BHA$Re <- 928* RheologyLog$'Mud Density Suction'[i]* BHA$Va* (BHA$d2 -
BHA$OD_SZ)/(BHA$Mue* 7.48)
        a <- (log10(n)+3.93)/50;
        b <- (1.75 -log10(n))/7;
        BHA$Fa <- ifelse(BHA$Re < 2100, 24/BHA$Re, a/(BHA$Re^b))
        BHA$PL <- BHA$Fa * (BHA$Va^2) * RheologyLog$'Mud Density Suction'[i] *
BHA$CMPN_LGTH/ (25.8* 7.48* (BHA$d2- BHA$OD_SZ))
        #set NA to 0
        BHA$PL[is.na(BHA$PL)] <- 0
        RheologyLog$total_annulus_PL[i] <- sum(BHA$PL)
        RheologyLog$ECD_in_PCF[i] <- round(RheologyLog$'Mud Density Suction'[i]+ 144*
RheologyLog$total_annulus_PL[i]/RheologyLog$BITDEPTH_TVD[i],3)
    }#end for-loop
    return(RheologyLog)
}#end function combine_log
```

The invention claimed is:

1. A computer-implemented method executed by at least one processor, the method comprising:
   accessing, by the at least one processor, sensor data that describes fluid properties of drilling fluid in a drilling environment, wherein the sensor data are generated by one or more sensor devices that are arranged in the drilling environment to periodically measure the fluid properties, and wherein assessing the sensor data includes generating a prediction model using artificial intelligence and machine learning operations to analyze the data;
   analyzing, by the at least one processor, the sensor data to generate an equivalent circulating density (ECD) value for the drilling fluid, wherein the analyzing of the sensor data to generate the ECD value is performed in real time with respect to the generation of the sensor data, and wherein generating the ECD value includes using the prediction model to predict pressure loss and the ECD value based on the sensor data, including determining the accuracy of the predicted pressure loss and the ECD value; and
   based at least partly on the ECD value, transmitting, by the at least one processor, at least one control signal to modify at least one operation of a drilling apparatus operating in the drilling environment, wherein the transmitting of the at least one control signal is performed in real time with respect to the generating and the analyzing of the sensor data.

2. The computer-implemented method of claim 1, wherein the sensor data describes one or more of density and rheology of the drilling fluid.

3. The computer-implemented method of claim 1, wherein:
   the sensor data is further analyzed to generate a total pressure loss for the drilling fluid; and
   the at least one control signal is sent further based on the total pressure loss.

4. The computer-implemented method of claim 1, further comprising:
   presenting, by the at least one processor, in a user interface (UI), a graphical representation of the ECD value in real time with respect to the generation and analyzing of the sensor data.

5. The computer-implemented method of claim 4, wherein the graphical representation shows a variation of the ECD value with respect to one or more of time and depth.

6. The computer-implemented method of claim 1, wherein analyzing the sensor data includes providing the sensor data as input to at least one model that has been trained, using at least one machine learning (ML) algorithm, to output the ECD value based on the sensor data.

7. The computer-implemented method of claim 6, wherein the output ECD value is further employed to retrain the at least one model.

8. The computer-implemented method of claim 1, wherein the at least one control signal is transmitted to modify the at least one operation that alters one or more of the weight and the rheology of the drilling fluid.

9. The computer-implemented method of claim 1, wherein the at least one control signal is transmitted to modify the at least one operation that alters the circulation rate of the drilling fluid.

10. The computer-implemented method of claim 1, wherein the at least one control signal is transmitted to modify the at least one operation that adjusts downhole pressure of the drilling fluid by applying surface back pressure from a choke.

11. A system comprising:
at least one processor; and
a memory communicatively coupled to the at least one processor, the memory storing instructions that when executed cause the at least one processor to perform operations comprising:
accessing sensor data that describes fluid properties of drilling fluid in a drilling environment, wherein the sensor data are generated by one or more sensor devices that are arranged in the drilling environment to periodically measure the fluid properties, and wherein assessing the sensor data includes generating a prediction model using artificial intelligence and machine learning operations to analyze the data;
analyzing the sensor data to generate an equivalent circulating density (ECD) value for the drilling fluid, wherein the analyzing of the sensor data to generate the ECD value is performed in real time with respect to the generation of the sensor data, and wherein generating the ECD value includes using the prediction model to predict pressure loss and the ECD value based on the sensor data, including determining the accuracy of the predicted pressure loss and the ECD value; and
based at least partly on the ECD value, transmitting at least one control signal to modify at least one operation of a drilling apparatus operating in the drilling environment, wherein the transmitting of the at least one control signal is performed in real time with respect to the generating and the analyzing of the sensor data.

12. The system of claim 11, wherein the sensor data describes one or more of density and rheology of the drilling fluid.

13. The system of claim 11, wherein:
the sensor data is further analyzed to generate a total pressure loss for the drilling fluid; and
the at least one control signal is sent further based on the total pressure loss.

14. The system of claim 11, the operations further comprising:
presenting, in a user interface (UI), a graphical representation of the ECD value in real time with respect to the generation and analyzing of the sensor data.

15. The system of claim 14, wherein the graphical representation shows a variation of the ECD value with respect to one or more of time and depth.

16. The system of claim 11, wherein analyzing the sensor data includes providing the sensor data as input to at least one model that has been trained, using at least one machine learning (ML) algorithm, to output the ECD value based on the sensor data.

17. The system of claim 16, wherein the output ECD value is further employed to retrain the at least one model.

18. The system of claim 11, wherein the at least one control signal is transmitted to modify the at least one operation that alters one or more of the weight and the rheology of the drilling fluid.

19. The system of claim 11, wherein the at least one control signal is transmitted to modify the at least one operation that alters the circulation rate of the drilling fluid.

20. The system of claim 11, wherein the at least one control signal is transmitted to modify the at least one operation that adjusts downhole pressure of the drilling fluid by applying surface back pressure from a choke.

* * * * *